(No Model.)
R. BRENNER.
WICK RAISING DEVICE FOR CENTRAL DRAFT LAMPS.
No. 510,378. Patented Dec. 5, 1893.
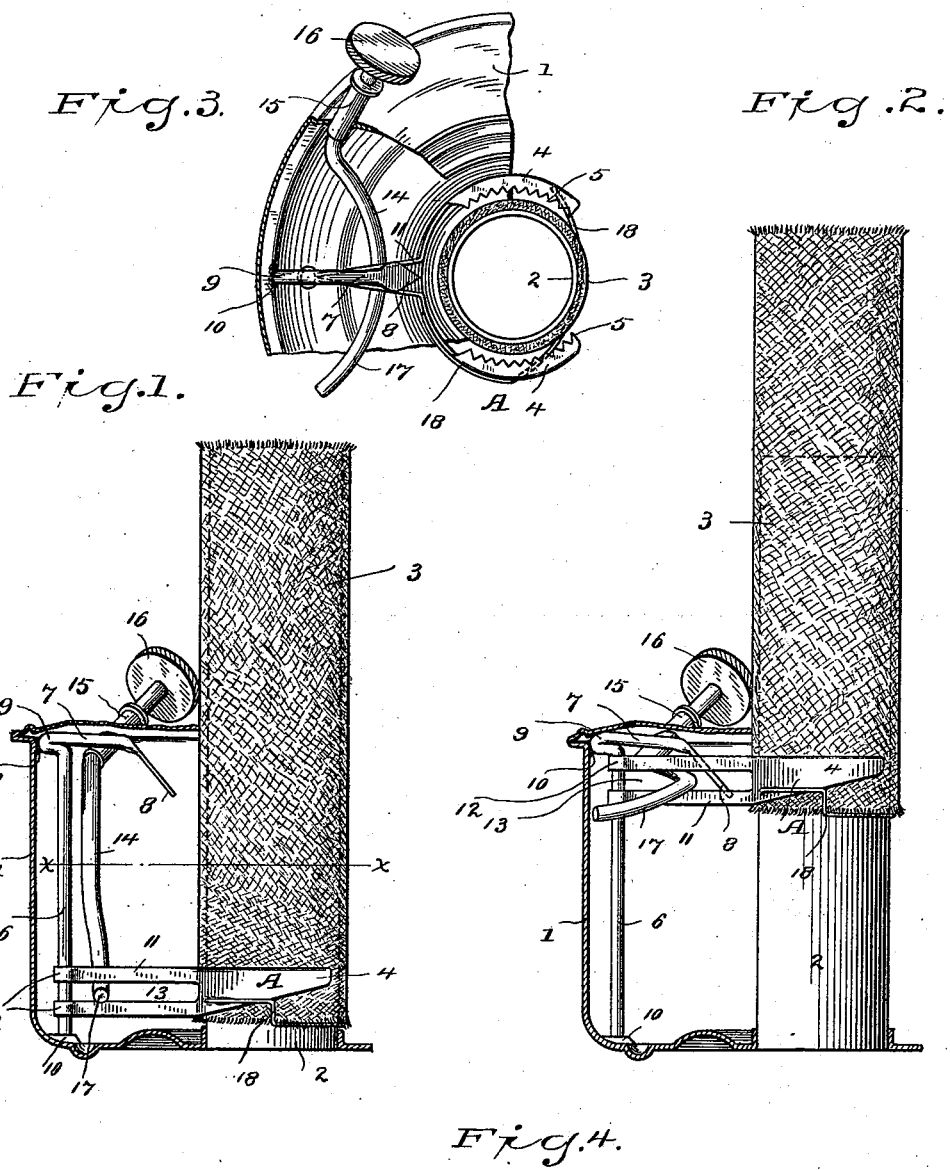
WITNESSES
H. A. Lamb
Pearl Reynolds
INVENTOR
Reinhold Brenner
By H. M. Wooster
Atty.
THE NATIONAL LITHOGRAPHING COMPANY,
WASHINGTON, D. C.

UNITED STATES PATENT OFFICE.

REINHOLD BRENNER, OF WATERBURY, CONNECTICUT.

WICK-RAISING DEVICE FOR CENTRAL-DRAFT LAMPS.

SPECIFICATION forming part of Letters Patent No. 510,378, dated December 5, 1893.

Application filed March 13, 1893. Serial No. 465,718. (No model.)

*To all whom it may concern:*

Be it known that I, REINHOLD BRENNER, a citizen of the United States, residing at Waterbury, in the county of New Haven and State of Connecticut, have invented certain new and useful Improvements in Wick-Raising Devices for Central-Draft Lamps; and I do hereby declare the following to be a full, clear, and exact description of the invention, such as will enable others skilled in the art to which it appertains to make and use the same.

My invention has for its object to provide a simple and inexpensive device for raising the wicks of central draft lamps. The requirements in a device of this class are that it be positive in its action, easy to operate in raising or lowering the wick, so constructed as to make it easy to remove and replace the wick, and furthermore practically impossible to get out of repair.

My present invention avoids the use of notched pinions and also avoids the use of devices which raise the wick carrier and wick by a direct pull, and is moreover extremely desirable from the standpoint of the manufacturer in that it is inexpensive to produce and easy to apply thereby saving greatly in the cost of construction and assembling.

With these ends in view I have devised the novel wick raising device which I will now describe referring by numbers to the accompanying drawings forming part of this specification, in which—

Figure 1 is a section of a portion of a lamp reservoir or fount showing my novel wick raising device in side elevation, the wick carrier and wick being at the extreme lowered position; Fig. 2 a similar view showing the wick carrier and wick in the raised position; Fig. 3 a plan view corresponding with Fig. 2 the top of the fount being broken away and the gripping jaws shown in the raised position and opened to release the wick, and Fig. 4 is a section on the line $xx$ in Fig. 1 looking down, the wick being shown as grasped and held by the jaws.

1 denotes the reservoir or fount of a central draft lamp, and 2 a tube extending upward therefrom which constitutes the inner air supply and also supports the wick 3 which in use is moved up and down over this tube as clearly shown in Figs. 1 and 2.

A denotes a wick carrier provided with spring jaws 4 having teeth 5 which are adapted to engage the wick from the outer side. This carrier moves upon a vertical rod 6 the base of which is rigidly secured to the base of the fount, and the top rigidly secured at the top of the fount, by solder as at 10 or in any suitable manner. The upper end of this rod extends inward and is provided with a head 7 the purpose of which is to open the jaws as will be more fully explained. In the present instance I have shown head 7 as formed by flattening the end of the rod, the sides of the head being beveled as at 8. I have also shown the rod as provided with a loop or bend 9, said loop being rigidly secured to the fount by means of solder as at 10 or in any suitable manner. The exact shape of the jaws is of course not of the essence of my invention. In the present instance I have shown the jaws as provided with shanks 11 having at their inner ends eyes 12 which slide on rod 6. This wick carrier is provided with a slot 13 through which the end of the curved raising shaft 14 passes as clearly shown in Figs. 1 and 2. This shaft extends obliquely upward and outward through the top of the fount, the straight portion of said shaft being journaled in a bearing 15 which is rigidly secured in the top of the fount, the outer end of the shaft being provided with a finger piece 16 for convenience in operation. The raising shaft is curved in such a manner, see Figs. 1, 2 and 3, that the portion which passes through slot 13 will swing upward from its lowest position when axial movement is imparted to the shaft, and will act as a cam to raise the carrier and with it the wick through engagement of the curved or cam portion of said shaft with the slot. For convenience in description I have designated the operative portion of the shaft, that is the portion of the curve which acts as a cam to raise the wick carrier, by 17. The operation of this cam will be clearly understood from Figs. 1 and 4 in which the shaft has been oscillated to place the cam and with it the wick carrier and wick at the lowest position, in connection with Figs. 2 and 3 in which the parts are shown after the shaft has been oscillated in the opposite direction to swing the cam upward causing said cam to move inward in the slot as it swings upward and the end of the cam portion of the shaft to pass farther through the slot as will be clearly understood by comparing Figs. 2 and 3 which show the raised position of the parts, with Figs. 1 and 4 which show the lowered position thereof.

The wick carrier may be made in any suitable manner, although I preferably strike it out and form it from a single piece of spring metal, the parts of said carrier being so constructed that the resiliency of the metal itself will cause the jaws to grasp the wick with sufficient power to hold it firmly at all times in use. When the jaws have been moved to their highest position the shanks are engaged by head 7, see Fig. 3, the bevels 8 of said head passing between the shanks and acting to spread them as clearly shown whereby the jaws are forced outward away from the wick and the latter is wholly released as clearly shown in Fig. 3. When the parts are in this position, should it be required to re-wick the lamp it is simply necessary to lift the wick out by hand it being wholly free and not held in any manner, and replace it with a new one.

In order to prevent the wick from slipping down into the lamp again when the jaws have been opened to release it, and to prevent a new wick from slipping down, I provide a wick holder 18 which is simply a piece of wire one end of which is soldered or otherwise secured to one of the jaws, the other end being curved around the tube and lying under the lower end of the wick so that when the jaws are opened to release the wick the latter will be supported by the holder. This holder furthermore serves as a stop in inserting a new wick, it being simply necessary in putting in a wick to raise the jaws to their highest position so that they will be opened through engagement of the shanks with the head and place the new wick over the wick tube letting it drop down through the jaws until it rests upon the holder. As soon as the shaft is oscillated to move the carrier downward the shanks will pass away from the head and will spring back to their normal position in which the jaws will grasp the wick firmly and carry it up or down over the wick tube as may be required, the wick being only released when the jaws are forcibly opened by engagement of the shanks with the head.

Having thus described my invention, I claim—

1. A wick raising device consisting of a vertically movable wick carrier having jaws adapted to grasp the wick, and a raising shaft having a curved portion which engages the wick carrier and acts as a cam to raise or lower the wick carrier when said shaft is oscillated.

2. The combination with a vertically movable wick carrier having jaws which grasp the wick and shanks which carry the jaws, and a rod upon which said carrier slides and which is provided with a head 7, of a wick raising shaft having a curved portion which engages the wick carrier and acts as a cam to raise or lower the wick carrier when said shaft is oscillated said jaws being opened and the wick released by engagement of the shanks with the head when the carrier is at its highest position.

3. The combination with rod 6, of the wick carrier consisting of jaws adapted to engage the wick, shanks which carry the jaws, and eyes at the ends of the shanks which slide over the rod, said carrier having a slot 13, and a wick raising shaft having a curved cam portion 17 which engages the slot whereby said carrier is moved vertically on the rod when said shaft is oscillated.

4. The combination with rod 6 having beveled head 7 and a wick carrier consisting of jaws adapted to engage the wick, shanks which carry the jaws and eyes at the ends of the shanks which slide over the rod, said carrier having a slot 13, of a wick raising shaft having a curved cam portion 17 which engages the slot whereby said carrier is moved vertically on the rod when said shaft is oscillated, and curved wick holder 18 secured to one of the jaws and lying under the lower end of the wick, said head being engaged by the shanks when the carrier is moved to its highest position whereby the wick is released by the jaws and may be readily removed, but is held against dropping down by the holder.

In testimony whereof I affix my signature in presence of two witnesses.

REINHOLD BRENNER.

Witnesses:
GEORGE M. CHAPMAN,
DAVID B. NETH.